T. D. Stetson,
Window Glass.
№ 49,167.   Patented Aug. 1, 1865.
Fig. 1.         Fig. 2.   Fig. 3.   Fig. 4.
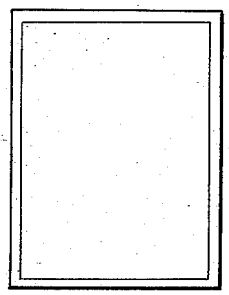   
Fig. 5.         Fig. 6.   Fig. 7.   Fig. 8.
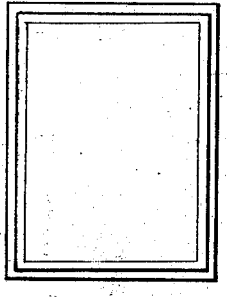   
Fig. 9.   Fig. 10.
Fig. 11.        Fig. 12.
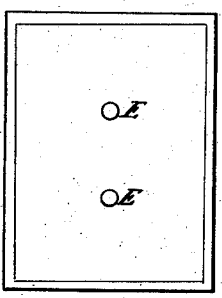 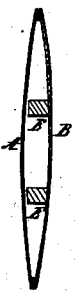
Witnesses:
V. Thompson.
D. W. Stetson.
Inventor:
Thomas D. Stetson

UNITED STATES PATENT OFFICE.

THOMAS D. STETSON, OF NEW YORK, N. Y.

IMPROVEMENT IN WINDOW-GLASS.

Specification forming part of Letters Patent No. 49,167, dated August 1, 1865.

*To all whom it may concern:*

Be it known that I, THOMAS D. STETSON, of New York city, in the State of New York, have invented certain Improvements in the Manufacture of Window-Glass; and I do hereby declare that the following is a full and exact description thereof.

My invention relates to means of duplicating the sheets or layers of glass in windows. It has long been known that doubling or trebling the glass has the effect of very greatly retarding the escape of heat from apartments and also of deadening the sound due to movements in the streets, &c., and many have been at the expense each winter of fitting extra sashes and glass upon the outside of the windows in the room or rooms most used. Others have introduced two panes of glass in each aperture in the sash, so that one should lie closely against the other when the glazing is completed.

The chief objection to the latter course is the increased labor attending the setting of the glass. Another is the risk—which is great unless much care is taken—that the inner faces of the glass shall exhibit finger-marks or other dirt; and as these faces can never be washed such accidents are very annoying. My invention overcomes these by securing the glass together at the place where it is made, or at a place specially provided with facilities for the purpose, so that the sheets are certain to be scrupulously clean on the inner faces and can be handled and set as a single pane.

To enable others skilled in the arts to which my invention relates to make and use my glass, I will proceed to describe it by the aid of the drawings hereto annexed, which form part of this specification, and of the letters marked thereon.

Figure 1 is a side view of a pane of my glass. Fig. 2 is a vertical section through the same. Fig. 3 is a section showing the position of such glass after it has been set in an ordinary sash. The remaining figures represent modifications of my glass which will be separately referred to.

Similar letters of reference indicate corresponding parts in all the figures.

B is the outer sheet, or that which is to be exposed to the weather when in the window.

A is the inner sheet, or that which is presented to the interior of the building.

C are the ordinary fastenings, of triangular sheet metal, or glazier's points, which tack or nail the glass in the sash, and D is the ordinary stopping of putty.

The sheets A and B are united together around their edges, and are separate and at a little distance apart at all other points. The union is effected by the aid of putty, which will adhere strongly to the clean surfaces of the glass, and of a strip of wood or string, which will resist a too close compression of the glass together while the putty is soft. Other cementing and bracing materials may be employed; but I have found these to answer well in practice, and the mode of manufacture which I have adopted with success is to wash and rub dry the faces of the glass which are to be presented together. Then lay one sheet flat upon a table, with its clean face uppermost. Then apply the slender stick or string along close to the edge and extending quite around on the clean face, having first carefully smeared the said stick or string with putty. Then lay the second sheet thereon, with its clean face downward, and then remove the whole together and subject it to pressure until the putty has hardened. If the glass so prepared is simply piled upon itself, pane upon pane, the lowermost will be sufficiently pressed by the superincumbent weight above. I increase the pressure as the drying or hardening proceeds, and after a few weeks the panes are ready for transportation or use. The edges will be found then to be strongly and tightly secured, and yet with a little elasticity due to the yielding of the wood or string before referred to.

When it is practicable to conduct the joining where the glass is manufactured it may not be necessary to rub or wash the glass.

Other material than putty may be used, such as white lead, various paints, plaster, gums, varnishes, coal-tar variously prepared, or raw or vulcanized rubber or gutta-percha. I have tried some of the silicates of potash and soda, and have not succeeded to my satisfaction when such cement was used. I believe common putty—*i. e.*, whiting and oil—to be reliable and reasonably economical.

I do not consider it very important that the two sheets of glass A and B shall be held at any precise distance apart. I prefer to hold them just out of contact each with the other. If they touch lightly or even strongly at some or all points, my invention is still of advantage, though I deem it better to take pains to hold them separate.

Fig. 4 represents a vertical section through a modification of my invention. In this form the sheets of glass are concave or dishing, and are applied together with their concave faces toward each other, or both concave faces in the same direction, as may be preferred. The figure shows the convex face of B applied to the concave face of A; but this fact is not of very great importance. The whole can contract and expand, or either sheet can contract and expand within certain limits, to allow compensation for changes of temperature.

Figs. 5, 6, and 7 correspond to Figs. 1, 2, and 3, except that one of the sheets is smaller than the other. This allows the compound pane of glass to be secured by the edge of the sheet which projects beyond the cemented portion. This form allows the use of sashes which are adapted to receive thin glass.

Fig. 8 is a section of a sash specially adapted to the kind of glass just described.

Fig. 9 shows my invention as applied to combine together into a single pane more than two thicknesses of glass. The intermediate sheet or sheets may be very thin. The several sheets so inclosed must be, of course, clean on both faces, and the cementing material must be applied on each side thereof, as indicated.

Fig. 10 shows a cross-section of my invention as used without holding the individual sheets of glass apart to any appreciable distance. The cementing material is indicated in all the figures by a red tint. The thickness of the strata in these forms of my invention may be very slight.

Fig. 11 is a side view, and Fig. 12 a vertical section, of another modification of my invention. Here two dishing sheets of glass are properly cleaned and applied and cemented with their concave faces together, and with their extreme edges as closely together as possible, but with a considerable thickness either of the cementing material alone or of the same with a rigid fibrous or elastic material as an inner wall therefor.

E E represent studs, of wood or other suitable material, adapted to prevent the central parts of the sheets from coming in contact with each other, and to transfer to the sheet A some of the strain applied to the sheet B, and the reverse, in case either is likely to be broken by any force. I cement the studs E only to one of the sheets of glass, B, leaving the other, A, free to stand at a little distance therefrom when it is most at ease in such condition. Both sheets A and B may be firmly and strongly connected at a great number of points over their entire surfaces by cementing both to the stud, if desired, under any circumstances, and I propose in such cases to employ ordinary glass or soluble glass, or both, so as to make the points of such junction as transparent as the other parts. I can, if it is deemed expedient, connect the sheets in such manner by continuous lines, dividing the whole area into rectangles or other figures, giving the effect of separate cells, instead of connected thin spaces, between the general surface of the sheets.

I propose to test the effect of uniting my sheets of glass A and B by welting or welding them along the edges and at the intermediate points, so as to have the space or spaces inclosed hermetically sealed.

I consider it important to inclose as little moisture as possible in the spaces between the sheets of my glass. To effect this I apply them as warm as practicable and in a dry atmosphere.

I can use putty or other very soft cementing material without any cord or other hard body therewith by simply introducing a hard support between the edges of the glass A and B, outside of the cemented line, and holding it there while the sheets are pressed thereon until the cement hardens; but I prefer to locate the cemented line at or very near the extreme edge, as represented.

I can, when necessary, locate my hard body independent of the cementing material, or just in contact with the inner edge thereof, instead of completely enveloping it with cement, as represented. There may be various modes of arranging such in order to save labor and expense or promote the freedom with which the parts may adapt themselves to circumstances during the manufacture. One modification I propose is to mingle small shot or the like in the putty or rubber and force it out from a suitable aperture directly upon the glass.

Having now fully described my invention, what I claim as new, and desire to secure by Letters Patent, is as follows:

As a new article of manufacture, double or duplex glass tightly joined at or near the edges and adapted to serve in the manner herein set forth.

THOMAS D. STETSON.

Witnesses:
D. W. STETSON,
V. THOMPSON.